United States Patent
Prieditis et al.

(10) Patent No.: US 9,390,386 B2
(45) Date of Patent: *Jul. 12, 2016

(54) METHODS, SYSTEMS, AND APPARATUS FOR PREDICTING CHARACTERISTICS OF A USER

(71) Applicant: Neustar IP Intelligence, Inc., Sterling, VA (US)

(72) Inventors: Armand Erik Prieditis, Mountain View, CA (US); Wonhong Lee, Mountain View, CA (US)

(73) Assignee: Neustar IP Intelligence, Inc., Sterling, VA (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/834,873

(22) Filed: Mar. 15, 2013

(65) Prior Publication Data

US 2014/0279785 A1   Sep. 18, 2014

(51) Int. Cl.
 *G06N 5/02* (2006.01)
 *G06Q 10/00* (2012.01)
 *G06F 21/31* (2013.01)

(52) U.S. Cl.
 CPC ............ *G06Q 10/00* (2013.01); *G06F 21/316* (2013.01); *G06F 2221/2111* (2013.01)

(58) Field of Classification Search
 CPC ....... G06N 5/02; G06N 5/048; G06N 99/005; G06Q 10/00; G06F 21/00; G06F 21/316; G06F 2221/2111
 USPC ................................................... 706/12, 46
 See application file for complete search history.

(56) References Cited

U.S. PATENT DOCUMENTS

| | | | |
|---|---|---|---|
| 2006/0200333 A1* | 9/2006 | Dalal et al. | 703/17 |
| 2012/0271722 A1* | 10/2012 | Juan et al. | 705/14.72 |
| 2013/0007256 A1* | 1/2013 | Prieditis | 709/224 |
| 2013/0031033 A1* | 1/2013 | Prieditis | 706/12 |
| 2013/0144818 A1* | 6/2013 | Jebara et al. | 706/12 |
| 2013/0173485 A1* | 7/2013 | Ruiz et al. | 705/319 |
| 2014/0074920 A1* | 3/2014 | Nowak et al. | 709/204 |
| 2014/0122383 A1* | 5/2014 | Shen et al. | 706/12 |
| 2014/0222583 A1* | 8/2014 | Bullock et al. | 705/14.66 |

OTHER PUBLICATIONS

Ansari A. et al., "Modeling multiple relationships in social networks", Journal of Marketing Research, vol. XLVII, Aug. 2011, pp. 713-728.*

Petersen, Kaare Brandy, et al., "The Matrix Cookbook", [http://matrixcookbook.com], (Nov. 14, 2008), 1-71.

* cited by examiner

Primary Examiner — Stanley K Hill
Assistant Examiner — Dave Misir
(74) Attorney, Agent, or Firm — Mahamedi IP Law LLP (57) ABSTRACT

Methods, systems, and apparatus for predicting the characteristics of a user are described. A model based on a conditional multivariate normal distribution and social relationship information between the selected user and each of one or more other users are obtained. One or more characteristics of the selected user are determined based on the model and the social relationship information. The user characteristics may be determined by adjusting the characteristics of a typical source user according to the model and the social relationship information of the selected user.

23 Claims, 6 Drawing Sheets

| | 508 | 512 | 516 | 520 | 524 | 528 | 532 | 536 |
|---|---|---|---|---|---|---|---|---|
| | CHARACTERISTIC 1 | CHARACTERISTIC 2 | USER 1 HOP COUNT | USER 2 HOP COUNT | USER 3 HOP COUNT | USER 4 HOP COUNT | USER 5 HOP COUNT | USER 6 HOP COUNT |
| 504 | LATITUDE 1 | LONGITUDE 1 | – | 1 | 2 | 1 | 3 | 4 |
| | LATITUDE 2 | LONGITUDE 2 | 1 | – | 1 | 2 | 2 | 3 |
| | LATITUDE 3 | LONGITUDE 3 | 2 | 1 | – | 1 | 1 | 2 |
| | LATITUDE 4 | LONGITUDE 4 | 1 | 2 | 1 | – | 2 | 3 |
| | LATITUDE 5 | LONGITUDE 5 | 3 | 2 | 1 | 2 | – | 1 |
| | LATITUDE 6 | LONGITUDE 6 | 4 | 3 | 2 | 3 | 1 | – |

*FIG. 5*

| MEAN OF CHARACTERISTIC 1 | MEAN OF CHARACTERISTIC 2 |
|---|---|
| LATITUDE 2 | LONGITUDE 5 |

*FIG. 6*

| MEAN OF USER 1 | MEAN OF USER 2 | MEAN OF USER 3 | MEAN OF USER 4 | MEAN OF USER 5 | MEAN OF USER 6 |
|---|---|---|---|---|---|
| 2 | 2 | 1 | 2 | 2 | 3 |

*FIG. 7*

|  | USER 1 | USER 2 | USER 3 | USER 4 | USER 5 | USER 6 |
|---|---|---|---|---|---|---|
| USER 1 | VARIANCE 1,1 | COVARIANCE 1,2 | COVARIANCE 1,3 | COVARIANCE 1,4 | COVARIANCE 1,5 | COVARIANCE 1,6 |
| USER 2 | COVARIANCE 2,1 | VARIANCE 2,2 | COVARIANCE 2,3 | COVARIANCE 2,4 | COVARIANCE 2,5 | COVARIANCE 2,6 |
| USER 3 | COVARIANCE 3,1 | COVARIANCE 3,2 | VARIANCE 3,3 | COVARIANCE 3,4 | COVARIANCE 3,5 | COVARIANCE 3,6 |
| USER 4 | COVARIANCE 4,1 | COVARIANCE 4,2 | COVARIANCE 4,3 | VARIANCE 4,4 | COVARIANCE 4,5 | COVARIANCE 4,6 |
| USER 5 | COVARIANCE 5,1 | COVARIANCE 5,2 | COVARIANCE 5,3 | COVARIANCE 5,4 | VARIANCE 5,5 | COVARIANCE 5,6 |
| USER 6 | COVARIANCE 6,1 | COVARIANCE 6,2 | COVARIANCE 6,3 | COVARIANCE 6,4 | COVARIANCE 6,5 | VARIANCE 6,6 |

*FIG. 8*

|  | USER 1 | USER 2 | USER 3 | USER 4 | USER 5 | USER 6 |
|---|---|---|---|---|---|---|
| CHARACTERISTIC 1 | COVARIANCE 1,1 | COVARIANCE 1,2 | COVARIANCE 1,3 | COVARIANCE 1,4 | COVARIANCE 1,5 | COVARIANCE 1,6 |
| CHARACTERISTIC 2 | COVARIANCE 2,1 | COVARIANCE 2,2 | COVARIANCE 2,3 | COVARIANCE 2,4 | COVARIANCE 2,5 | COVARIANCE 2,6 |

METHODS, SYSTEMS, AND APPARATUS FOR PREDICTING CHARACTERISTICS OF A USER

TECHNICAL FIELD

Various embodiments illustrated by way of example relate generally to the field of data processing and, more specifically, to a method and apparatus for predicting characteristics of a user.

BACKGROUND

The prediction of the characteristics of a user is of importance to a wide variety of applications. As used herein, the term "characteristic" may include demographics characteristics such as gender, race, age, disabilities, mobility, income, home ownership, and employment status; personality characteristics; psychographics; interests; biases; likes; dislikes; values; attitudes; interests; lifestyles, activities; opinions; tastes; usage rates; brand preference; and firmographics such as industry, seniority, functional area, behavioral variables, geographic location, and anything that can be used to characterize a user. A "geographic location" or "geographic position" may be defined in terms of country/city/state/address, country code/zip code, political region, geographic region designations, latitude/longitude coordinates, spherical coordinates, Cartesian coordinates, polar coordinates, Global Positioning System (GPS) data, cell phone data, directional vectors, proximity waypoints, or any other type of geographic designation system for defining a geographical location or position.

One type of characteristic is the geographic location of the user. For example, knowing the geographic location of the user may be important for fraud detection, localized advertising, authentication, and the like. Various methods of locating electronic emitters to a point on the earth, or geolocating emitters, have been used for many years to find the geographic location of a user. These methods include a range of techniques from high-frequency direction finding triangulation techniques for finding a ship in distress to locating the origin of an emergency "911" call on a point-to-point wireline telephone system. These techniques may be passive and cooperative, such as when geolocating oneself using the GPS, or active and uncooperative, such as a military targeting radar tracking its target.

These geolocation techniques may be targeted against a stationary or moving target, but most of these direction finding and geolocation techniques start with the assumption of working with signals in a linear medium. For example, in radio triangulation, several stations each determine the direction from which a common signal was intercepted. Because the assumption can be made that an intercepted signal travels in a straight line, or at least on a known line of propagation, from the transmitter to each station, lines of bearing can be drawn from each station in the direction from which the signal was intercepted. The point where the lines of bearing cross is the point at which the signal source is assumed to be located.

In addition to the direction of the signal, other linear characteristics can be used to geolocate signals, including propagation time and Doppler shift, but the underlining tenets that support these geolocation methodologies may not be applicable to a network environment. Network elements may not be connected via the shortest physical path between them, data transiting the network may normally be queued and later forwarded depending on network loading, causing the data to effectively propagate at a non-constant speed, and switching elements within the network may cause the data to propagate through non-constant routing. Thus, traditional time-distance geolocation methodologies may not be effective in a network environment. Network switching and queuing delays may produce echo distance results several orders of magnitude greater than the actual distance between the computers.

In a fully meshed network, every station from which a geolocation is initiated may be directly connected to every endpoint from which an "echo timing" is measured. The accuracy results of geolocation using round-trip echo timing may be dependent on: the degree to which the network is interconnected or "meshed," the specific web of connectivity between the stations and endpoints, the number and deployment of stations, the proximity of the stations to the endpoints, and the number and deployment of endpoints chosen.

There are other methods for physically locating a user's location relative to a logical network address on the Internet that do not rely on the physics of electronic propagation. One method currently in use for determining the location of a network address relies on network databases. This method of network geolocation may look up the IP (internet protocol) address of the host computer to be located, may retrieve the physical address of a point of contact for that logical network address from the appropriate registry and may then cross-reference that physical address to a geographic location.

Another approach uses distance estimates to an IP address associated with a user's location (i.e., the "target" IP address) from multiple beacons, each of which has a known location, to "triangulate" the geographic location of the user. A beacon may be considered a network entity having a known location. In this approach, the distance estimate may be based on traceroute information comprising a round-trip transit time of an Internet packet traveling from each of one or more other users to the user.

A second conventional approach uses machine learning to find a model, which relates traceroute information to jurisdictional location (e.g. country, state, county, etc.) based on training examples. In this approach, the training examples may comprise one or more pairs of the actual geographic location of a user and the round-trip transit times from the one or more other users. A major shortcoming of this approach is that the jurisdictional location may be coarse-grained, thus limiting the approach's accuracy.

A third conventional approach may find the geographic location of a "nearest" neighbor in a set of training examples, where the "nearest" neighbor may be one whose round-trip transit times are most similar to the round-trip transit times for the user.

A fourth conventional approach may predict a user's location based on the locations of a set of friends. For example, the geographic location of a user may be a location that is as close as possible to a set of "friend" locations while as far as possible from "non-friends."

BRIEF DESCRIPTION OF THE DRAWINGS

Embodiments are illustrated by way of example and not limitation in the figures of the accompanying drawings, in which like references indicate similar elements and in which.

DETAILED DESCRIPTION

According to an example embodiment, methods, systems, and apparatus for predicting characteristics of a user are described. Other features will be apparent from the accompanying drawings and from the detailed description that follows. In the following description, for purposes of explanation, numerous specific details are set forth in order to provide a thorough understanding of embodiments. It will be evident, however, to one of ordinary skill in the art that the present description may be practiced without these specific details.

Overview

According to various example embodiments described herein, the disclosed methods, systems, and apparatus may predict one or more characteristics of a user based on social relationship information and a model that relates the social relationship information to characteristics of the users. The model may be used to adjust the typical characteristics of a set of source users to match the predicted characteristics of a selected, or target, user based on the social relationship information.

As used herein, the term, "social relationship information" may refer to information related to a social relationship between two or more people. Examples of social relationships may include direct or indirect friendships, links to the web page of another user, a follower/followee relationship, an admiration relationship, a Rich Site Summary (RSS) subscription, a trust relationship, references to other users, personal relationships, professional relationships, academic relationships, student/teacher relationships, or any other type of social relationship between two users.

Figure 1A:
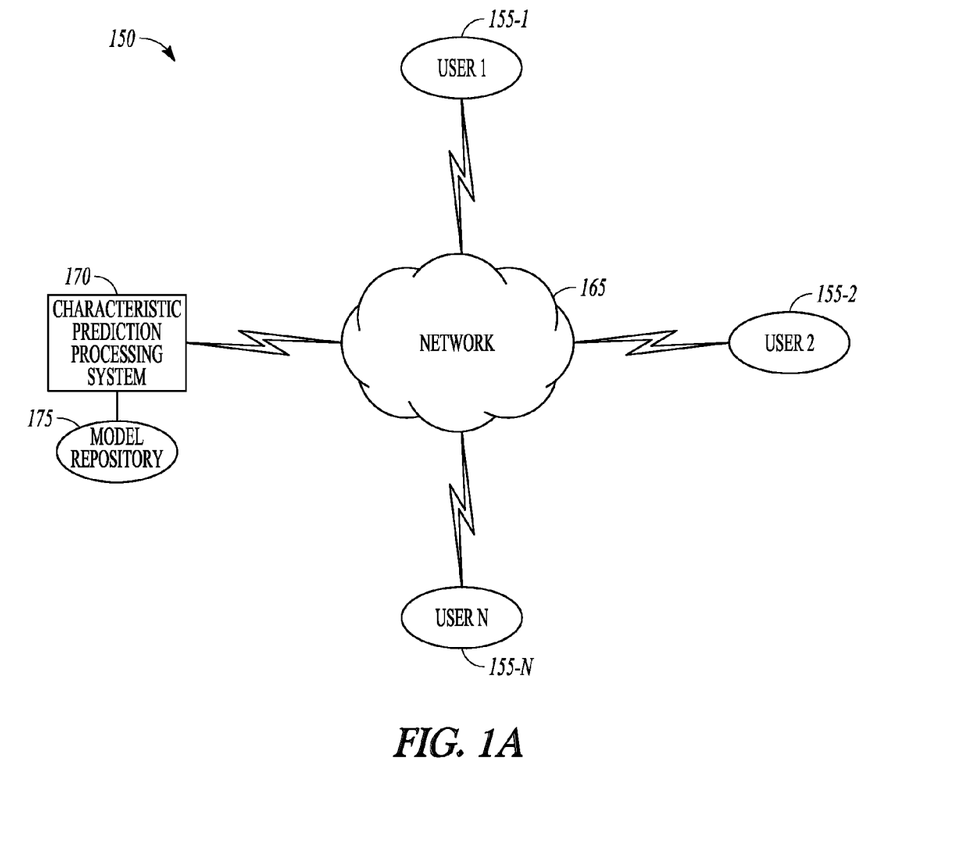
FIG. 1A is a block diagram of a system for predicting characteristics of a user, in accordance with an example embodiment.

FIG. 1A is a block diagram of a system 150 for predicting characteristics of a user, in accordance with an example embodiment. In one example embodiment, the system 150 may comprise one or more user devices 155-1, 155-2 and 155-N, a characteristic prediction processing system 170, a model repository 175, and a network 165. Each user device (e.g., 155-1) may be a personal computer (PC), a cellular phone, a personal digital assistant (PDA), or any other appropriate computer device. Each user device (155-1, 155-2 or 155-N) may include an application for initiating the prediction of user characteristics for one or more users.

The characteristic prediction processing system 170 may be a server, client, or other processing device that includes an operating system for executing software instructions. In one example embodiment, the characteristic prediction processing system 170 may predict the characteristics for one or more selected users based on a model and social relationship information for the selected users. The model repository 175 may be a database and/or other data structure and may store one or more models, described more fully below in conjunction with FIGS. 3 and 6-9.

The network 115 may be a local area network (LAN), a wireless network, a metropolitan area network (MAN), a wide area network (WAN), a wireless network, a network of interconnected networks, the public switched telephone network (PSTN), and the like.

Figure 1B:
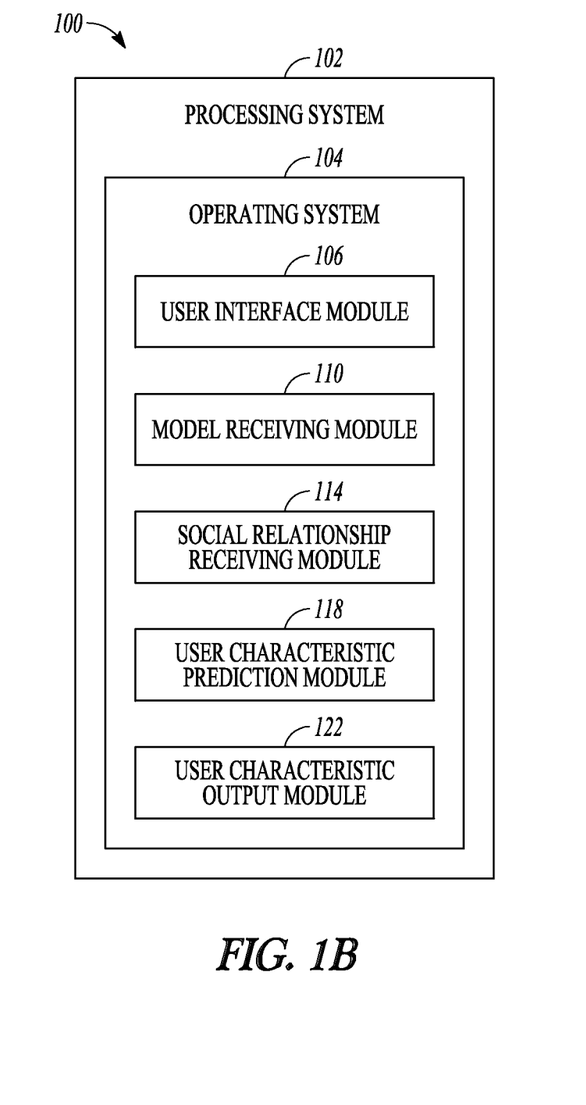
FIG. 1B is a block diagram of an apparatus for predicting characteristics of a user, in accordance with an example embodiment.

FIG. 1B is a block diagram of an apparatus for predicting characteristics of a user, in accordance with an example embodiment. For example, the apparatus 100 may be used to predict user characteristics and, accordingly, is described by way of example with reference thereto.

The apparatus 100 is shown to include a processing system 102 that may be implemented on a server, client, or other processing device that includes an operating system 104 for executing software instructions. In accordance with an example embodiment, the apparatus 100 may include a user interface module 106, a model receiving module 110, a social relationship receiving module 114, a user characteristic prediction module 118, and a user characteristic output module 122. In accordance with an example embodiment, the apparatus 100 may include a data storage interface (not shown).

The user interface module 106 may provide for the selection of a target user and a model, and may present one or more predicted characteristics of the user. The model receiving module 110 may be used to obtain a model, and the social relationship receiving module 114 may be used to obtain social relationship information. For example, the social relationship receiving module 114 may be used to obtain the social relationship information of the target user. The user characteristic prediction module 118 may predict the characteristics of a user based on the model and social relationship information. The user characteristic output module 122 may format the user characteristics for use by an application or for storage and archival purposes. The data storage interface may provide access to, for example, a database(s) that stores the model and/or the social relationship information.

In an example embodiment, the number of hops between a selected user and one or more other users may be used to predict the characteristics of the selected user based on a model and social relationship information. The user characteristics may be predicted without knowledge of the specific characteristics of other users whose characteristics are also to be predicted. As used herein, a single hop may correspond to a direct social relationship between two users. In one example embodiment, a single link, or hop, between two users may indicate a direct relationship; two links, or hops, between two users may indicate a "friend of a friend"; and three links, or hops, between two users may indicate a "friend of a friend of a friend." The various example embodiments can be embodied in a system that may receive social relationship information associated with a target user and may receive a model that relates the social relationship information of a set of source users to the characteristics of the source users. The system may predict one or more characteristics of the target, or selected, user based on the model and the social relationship information of the target user. The system may return one or more results that indicate the predicted characteristics of the user.

In one example embodiment, one or more characteristics of a target, or selected, user may be predicted based on a parametric model. The parametric model may relate the social relationship information of a set of source users to one or more characteristics of the set of source users, and may relate the typical characteristics of one or more source users to the characteristics of the target user. For example, the source users may be socially related with each other and the nature of the social relationships may imply that the characteristics of the source users are similar to the characteristics of the target user. The parameters of the parametric model may comprise a mean vector and a covariance matrix, as described more fully below. The model may be based on a multivariate normal distribution.

In one example embodiment, a parametric model that relates the social relationship information of one or more source users to the characteristics of the one or more source users may be obtained. The characteristics of a target user may be determined based on the parametric model and the social relationship information for the target user. One or more characteristics of the target user may be returned.

The functionality of the various example embodiments may be used, for example, in fraud detection, localized advertising, crime forensics, and the like, and in facilitating a business to adhere to local, governmental or self-imposed restrictions on usage. For example, the system may be used to predict the geographic location of a user based on social relationship information.

The various example embodiments may be used as an on-demand user characteristics prediction engine for a selected user by extracting social relationship information between the selected user and one or more other users. The system may also be used in a "batch" mode to pre-compute and cache the user characteristics of a database of users.

In one example embodiment, a model may be determined for facilitating the prediction of characteristics of a user by finding a relationship between the characteristics of one or more source users and the social relationship information of the one or more source users. The determination of the model may be based on analyzing training data. This approach may be called parametric because of the one or more parameters that characterize the training data. The determination of the model may be performed by the characteristic prediction processing system 170, or may be performed by another entity and obtained by the characteristic prediction processing system 170.

The parameters of the model may comprise two mean vectors and two covariance matrices that characterize the training data. In one example embodiment, the training data may comprise one or more training examples, each of which comprises the user characteristics of a source user and the corresponding social relationship information associated with one or more other source users. The training examples may be characterized by mapping two or more training examples to one or more parameters of the model, as described more fully below. For example, a model may be determined that relates characteristics of a user, such as the latitude and longitude of the user, to social relationship information associated with the user, such as a number of hops from the user to each of one or more other users. The model may be used in conjunction with the characteristics of a typical user to predict the characteristics of a target user. The cited approach may be parametric rather than non-parametric.

DETAILED DESCRIPTION OF AN EXAMPLE EMBODIMENT

Generally, example embodiments for predicting one or more characteristics of a user are disclosed.

In one example embodiment, a determination of one or more characteristics of a user may be based on a model relating the number of hops between source users, and the characteristics of the typical source user. A source user may be any user from whom training data may be obtained. In one example embodiment, a single link, or hop, between two users may indicate a direct relationship; two links, or hops, between two users may indicate a "friend of a friend"; and three links, or hops, between two users may indicate a "friend of a friend of a friend."

In one example embodiment, the source data of the model may be derived from training data. In regard to training data, the mean may represent the average value of a parameter from a set of training data. Similarly, the covariance may represent the sample covariance of a parameter from a set of training data. In one example embodiment, the model may be generated by automated means. In one example embodiment, an automatically-generated model may be hand-tuned.

In one example embodiment, user characteristics may be predicted by analyzing the social relationships between users in substantially real-time. In one example embodiment, user characteristics may be predicted in a "batch" mode and the user characteristics may be pre-computed and cached based on social relationships of the users.

In one example embodiment, the model may be based on a conditional multivariate normal distribution with mean vector m and covariance matrix s. In one example embodiment, the two or more source users may be in a social relationship with each other and the social relationship information and the characteristics of the source users may be used to determine the parameters of the model, as described more fully below. The input to a user characteristic prediction method may be a count of "hops" from a target user to each of one or more other users. The output of the user characteristic prediction method may be a prediction comprising the most likely characteristics of the target user and the covariance of the prediction.

In one example embodiment, the parametric model may comprise one or more parameters. For example, a conditional multivariate normal model may comprise two mean vectors and two covariance matrices, as described more fully below. A social relationship mean vector may represent, for example, the typical number of links (hops) from one source user to another source user. A user characteristic mean vector may represent, for example, the characteristics of a typical source user. A social relationship covariance matrix may represent the deviation associated with pairs of the typical values of the social relationship information. A user characteristic-social relationship covariance matrix may represent the deviation associated with pairs of the typical values of the social relationship information and user characteristics. The mean vectors and the covariance matrices may be used to predict the characteristics of a target user. For example, the present disclosure recognizes that, as the number of links or hops between two users increases, the quality of inferring user characteristics may degrade and, as the number of links or hops between two users decreases, the quality of inferring user characteristics may increase.

In one example embodiment, other models may have different parameters and different methods by which to combine the parameters. Example methods include neural networks, decision trees, support vector machines, and machine learning regression methods, including multiple linear regression, partial least squares, k-nearest neighbor, and the like.

In one example embodiment, a model may be based on conditional multivariate normal distributions grouped into one or more subclasses. For example, the subclasses may be represented by a mixture distribution. A mixture comprises the mixing proportions, the probability, of each subclass (which add up to one) and the parameters within each subclass, which define a probability distribution. For example, the parameters may include the mean and covariance (as described above, except for each subclass) for a conditional multivariate normal distribution. The conditioning for each subclass may be on the input variables. Other distributions may be substituted for the conditional multivariate normal.

Figure 2:
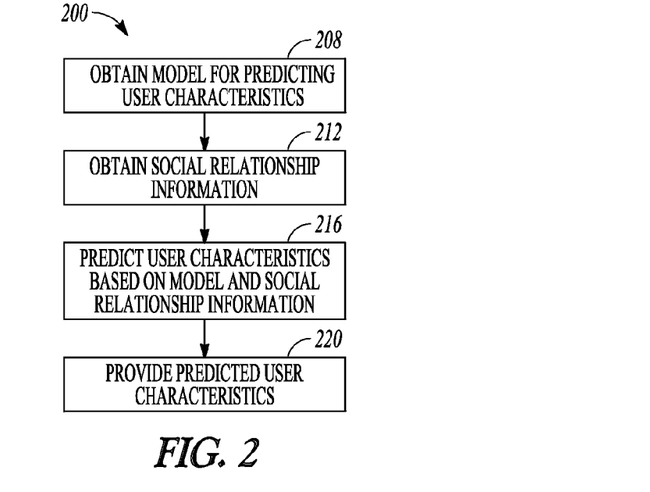
FIG. 2 is an example flowchart for predicting characteristics of a user, in accordance with an example embodiment.

FIG. 2 is an example flowchart showing a method 200 for predicting user characteristics, in accordance with an example embodiment. In one example embodiment, one or more different models may be used to predict a user's characteristics based on a model and the user's social relationships to other users. In one example embodiment, the method 200 may be performed by the user characteristic prediction module 118.

A model may be obtained (operation 208) and information describing the social relationships between a target user and one or more other users may be obtained (operation 212). One or more user characteristics may be predicted based on the model and the information describing the social relationships between the target user and the one or more other users (operation 216). The predicted characteristics may be provided, for example, to an application or database repository (operation 220).

Figure 3:
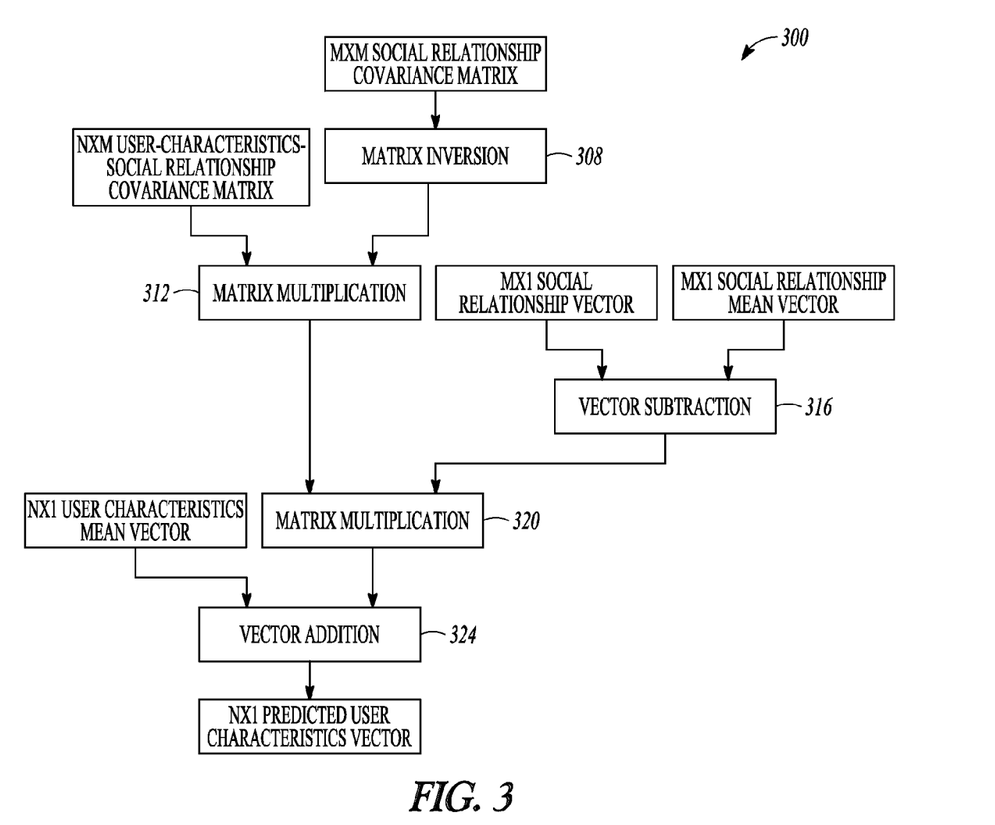
FIG. 3 is an example flowchart for utilizing a conditional multivariate normal distribution to determine one or more user characteristics, in accordance with an example embodiment.

FIG. 3 is an example flowchart for a method 300 for utilizing a conditional multivariate normal distribution to determine one or more user characteristics, in accordance with an example embodiment. The variable m may correspond to a count of users. The variable n may correspond to a count of types of user characteristics. Such a user characteristic may be, for example, the latitude and longitude of the user or may correspond to the Cartesian coordinates of the user. In one example embodiment, the model may comprise an m×m social relationship covariance matrix which may represent how the social relationships co-vary among themselves; an n×m user characteristics-social relationship covariance matrix which may represent how the user characteristics co-vary with the social relationships; an n×1 user characteristics mean vector which may represent the mean value of the user characteristics for a typical user; and an m×1 social relationship mean vector which may represent the mean value of the social relationships of a typical user. An m×1 social relationship vector representing the social relationships for the selected user for whom the user characteristics are to be predicted may be provided as an input to the user characteristic prediction module 118 and an n×1 predicted user characteristics vector may be produced as an output of the user characteristic prediction module 118. Each value of the m×1 social relationship vector may be a count of links or hops between the selected user and one of the other users. Each value of the n×1 predicted user characteristics vector may be a predicted characteristic value.

In an example embodiment, the model may be based on a conditional multivariate normal distribution with mean vector m and covariance matrix s. The input to the user characteristic prediction method may be the social relationship information for a target user and the output may be a prediction comprising the characteristics of the target user and the covariance of that prediction. Other example embodiments involve prediction with conditional multivariate normal distributions grouped into one or more subclasses, which may enable higher accuracy.

The processing operations shown in FIG. 3 can be viewed as a way to adjust the characteristics of a typical user based on information from the social relationships of the source users and the social relationships of the target user to derive the user characteristics of a target user. In particular, a matrix inversion operation 308, a vector subtraction operation 316, and matrix multiplication operations 312 and 320 may determine how to weight the differences between the typical user characteristics values and the actual characteristic values for a user for which the user characteristics are to be predicted. A vector addition operation 324 may combine the weighted user characteristic variances for a user with the mean (or typical) values to generate the output user characteristics for the selected user.

In one example embodiment, the m×m social relationship covariance matrix may be inverted (operation 308) and may be multiplied by the n×m user characteristics-social relationship covariance matrix (operation 312). The m×1 social relationship mean vector may be subtracted from the m×1 social relationship vector (operation 316), and the result may be multiplied by the result of operation 312 to generate a user characteristics adjustment vector (operation 320). The user characteristics adjustment vector may be added to the n×1 user characteristics mean vector to generate the n×1 predicted user characteristics vector (operation 324). In one example embodiment, operations 308 through 324 may be performed by the user characteristic prediction module 118.

The output produced by the user characteristics prediction module 300, as shown in FIG. 3, is an n×1 predicted user characteristics vector that represents the most likely user characteristics for the target user based on the conditional multivariate normal distribution. The outputted predicted user characteristics may be provided to the user characteristics output module 122, as shown in FIG. 1, which can generate user characteristics data in a form suitable for a particular requesting application or database repository.

Figure 4:
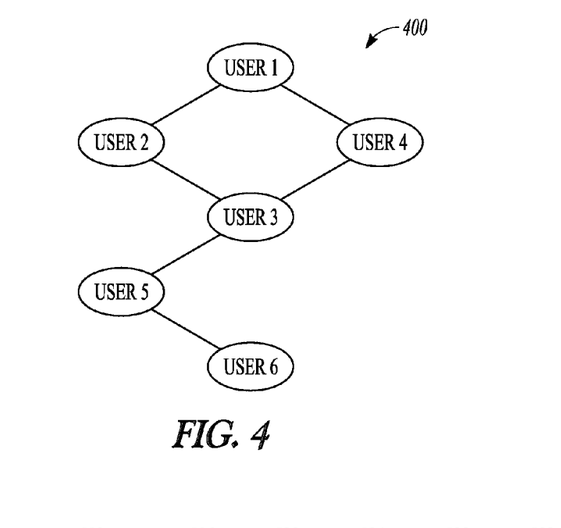
FIG. 4 is an example representation of the social relationships between a plurality of users, in accordance with an example embodiment.

FIG. 4 is an example representation 400 of the social relationships among a plurality of users, in accordance with an example embodiment. User 1 has direct relationships with user 2 and user 4; user 2 and user 4 have direct relationships with user 1 and user 3; user 3 has direct relationships with user 2, user 4, and user 5; user 5 has direct relationships with user 3 and user 6; and user 6 has a direct relationship with user 5. The relationship between user 6 and user 4, for example, is characterized by a hop count of three.

Figure 5:
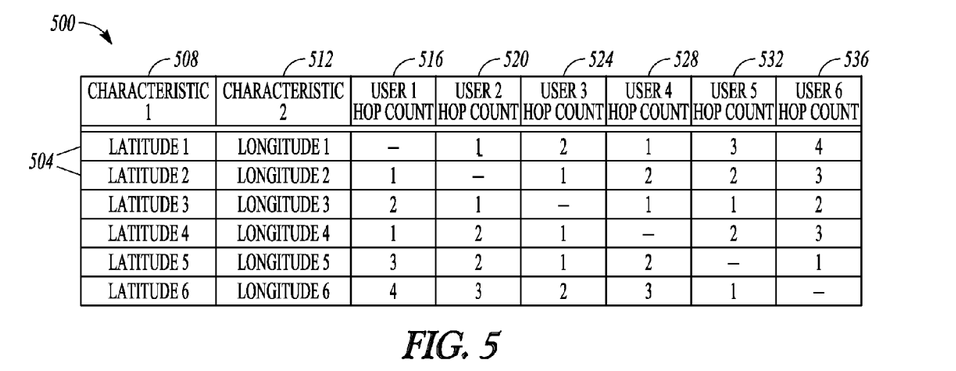
FIG. 5 is an example representation of training data for determining a model to predict characteristics of a user, in accordance with an example embodiment.

FIG. 5 is an example representation of training data 500, in accordance with an example embodiment. For example, the training data 500 may comprise a row 504 corresponding to one user, where each row 504 may comprise the characteristics of the corresponding user (e.g. latitude and longitude) and the corresponding social relationship information (e.g. the number of hops from the corresponding user to each of the other users). Column 508 may correspond to a first user characteristic (e.g. latitude); column 512 may correspond to a second user characteristic (e.g. longitude); column 516 may correspond to social relationship information (e.g. a number of hops) between a first user and the user corresponding to the row 504; column 520 may correspond to social relationship information (e.g. a number of hops) between a second user and the user corresponding to the row 504; column 524 may correspond to social relationship information (e.g. a number of hops) between a third user and the user corresponding to the row 504; column 528 may correspond to social relationship information (e.g. a number of hops) between a fourth user and the user corresponding to the row 504; column 532 may correspond to social relationship information (e.g. a number of hops) between a fifth user and the user corresponding to the row 504; and column 536 may correspond to social relationship information (e.g. a number of hops) between a sixth user and the user corresponding to the row 504.

Figure 6:
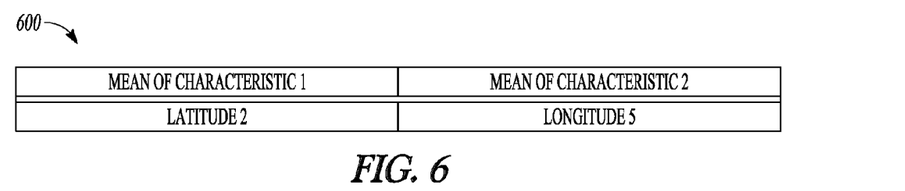
FIG. 6 is an example representation of a user characteristic mean vector, in accordance with an example embodiment.

FIG. 6 is an example representation of a user characteristic mean vector 600, in accordance with an example embodiment. In one example embodiment, the user characteristic mean vector 600 may be determined by calculating the mean value of the first user characteristic (corresponding, for example, to the mean value of column 508) and the mean value of the second user characteristic (corresponding, for example, to the mean value of column 512).

Figure 7:
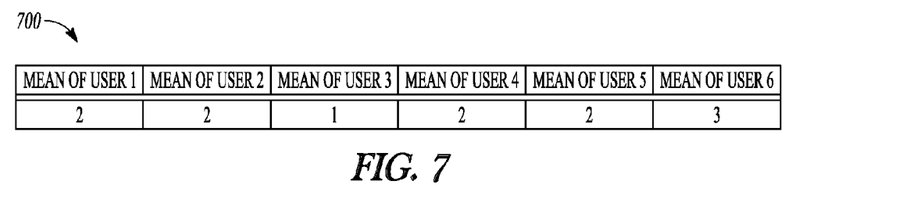
FIG. 7 is an example representation of a social relationship mean vector, in accordance with an example embodiment.

FIG. 7 is an example representation of a social relationship mean vector 700, in accordance with an example embodiment. In one example embodiment, the social relationship mean vector 700 may be determined by calculating the mean value of the social relationship information for the first user (corresponding, for example, to the mean value of column 516), the mean value of the social relationship information for the second user (corresponding, for example, to the mean value of column 520), and the mean value of the social relationship information for the Nth user. For example, the mean value of column 516 is 2 and the mean value of column 520 is 2.

Figure 8:
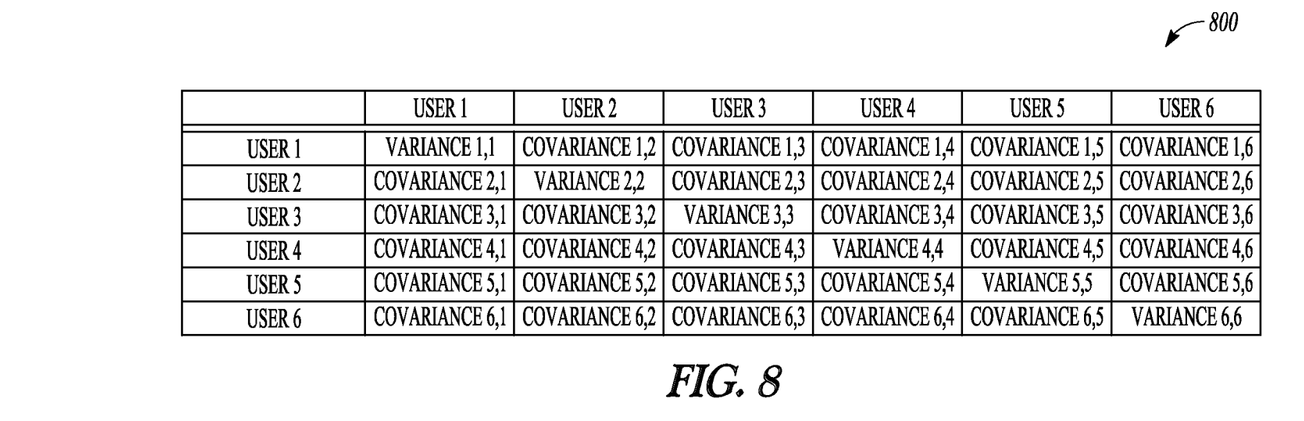
FIG. 8 is an example representation of a social relationship covariance matrix, in accordance with an example embodiment.

FIG. 8 is an example representation of a social relationship covariance matrix 800, in accordance with an example embodiment. In one example embodiment, the social relationship covariance matrix 800 may be determined from the training data and may comprise m rows and m columns, where row, and column, may correspond to $user_i$ and where $1 \leq i \leq m$. Each element of the social relationship covariance matrix 800 may represent the covariance of the social relationship information between the users corresponding to the selected row, and $column_j$ (when $i \neq j$) and may represent the variance of the social relationship information of the user corresponding to the selected row, and $column_j$ (when $i=j$).

Figure 9:
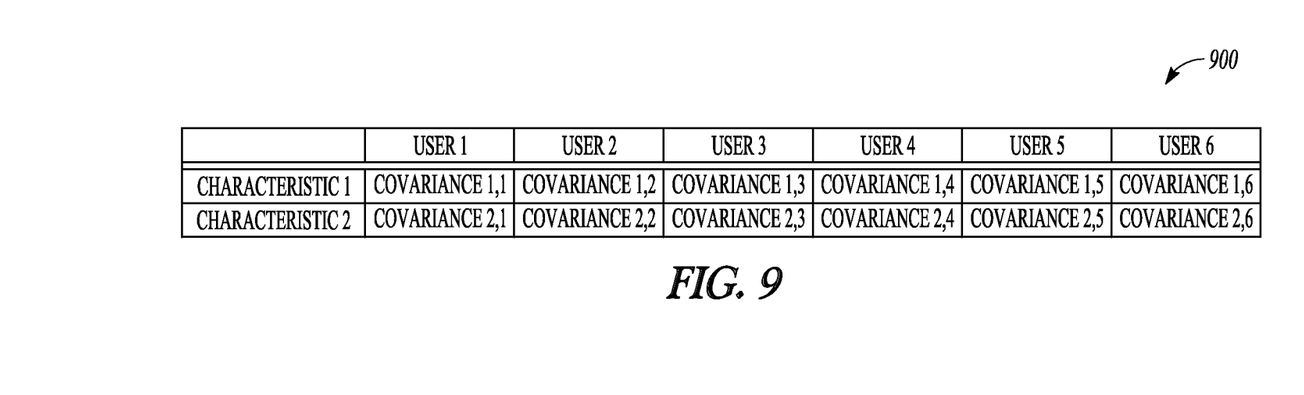
FIG. 9 is an example representation of a user characteristics-social relationship covariance matrix, in accordance with an example embodiment.

FIG. 9 is an example representation of a user characteristics-social relationship covariance matrix 900, in accordance with an example embodiment. In one example embodiment, the user characteristics-social relationship covariance matrix 900 may be determined from the training data and may comprise n rows and m columns, where each row may correspond to a type of user characteristic and column, may correspond to $user_i$, where $1 \leq i \leq m$. Each element of the user characteristics-social relationship covariance matrix 900 may represent the covariance of the corresponding user characteristic with the social relationship information of $user_i$. For example, an element may be the covariance of the latitude of a selected user with the hop count of the corresponding user.

Figure 10:
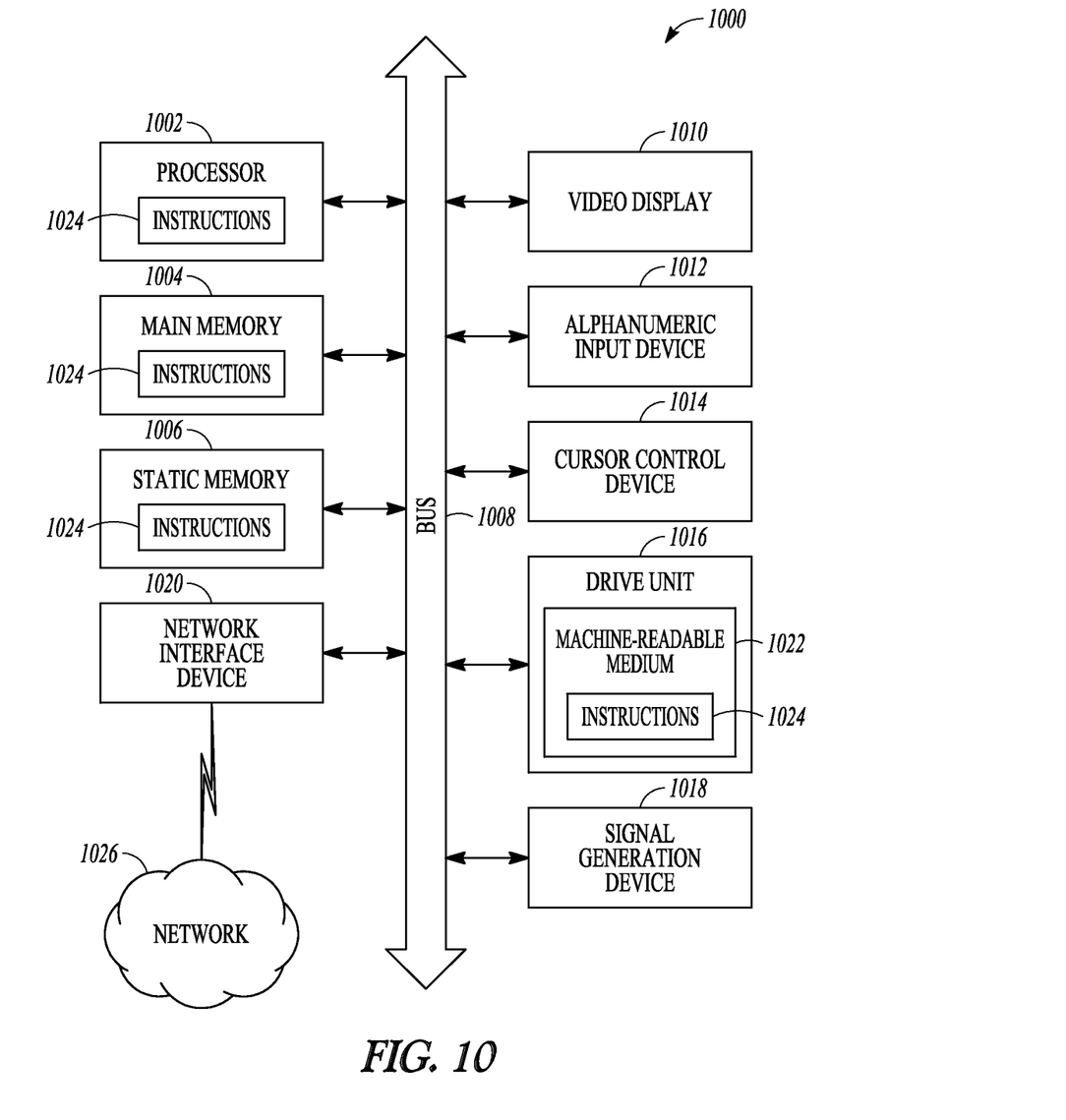
FIG. 10 shows a diagrammatic representation of a machine in the example form of a computer system, in accordance with an example embodiment.

FIG. 10 shows a diagrammatic representation of a machine in the example form of a computer system 1000 within which a set of instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions 1024 (e.g., software) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media, and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The foregoing description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a method and apparatus for predicting characteristics of a user have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A method for predicting one or more characteristics of a selected user, comprising:
    obtaining a model based on a conditional multivariate normal distribution that relates social relationship information of one or more source users to characteristics of the one or more source users;
    obtaining social relationship information relating the selected user and each of one or more other users; and
    determining, using a hardware device, one or more characteristics of the selected user based on the model and the social relationship information that relates the selected user and each of the one or more other users,
    wherein determining the one or more characteristics comprises:
        multiplying an inverted $m \times m$ social relationship covariance matrix and a $n \times m$ user characteristics social relationship covariance matrix to derive a $n \times m$ combined covariance matrix, wherein the social relationship covariance matrix represents a deviation associated with pairs of typical values of the social relationship information of the one or more source users;
        subtracting a $m \times 1$ social relationship mean vector from a $m \times 1$ social relationship input vector to derive a social relationship difference vector, wherein the social relationship mean vector represents the characteristics of the one or more source users;
        multiplying the derived $n \times m$ combined covariance matrix and the social relationship difference vector to derive a user characteristic adjustment vector; and
        adding the user characteristic adjustment vector and a $n \times 1$ user characteristics mean vector to derive a $n \times 1$ user characteristics vector.

2. The method of claim 1, wherein the social relationship information comprises one or more counts of hops between the selected user and each of the one or more other users.

3. The method of claim 1, wherein the determining adjusts one or more characteristics of a typical user, as determined from the one or more source users, to determine the one or more characteristics of the selected user.

4. The method of claim 1, wherein the model is based on the conditional multivariate normal distribution with mean vector m and covariance matrix s.

5. The method of claim 1, wherein the model is based on a social relationships mean vector representing a number of hops from a typical source user to each of the one or more source users.

6. The method of claim 1, wherein the model comprises a $m \times m$ social relationship covariance matrix, the $m \times m$ social relationship covariance matrix representing a covariance of social relationships of two or more of the one or more source users.

7. The method of claim 1, wherein the model is based on a $n \times m$ user characteristics covariance social relationship matrix, the $n \times m$ user characteristics covariance social relationship matrix representing a covariance of one or more characteristics of two or more source users with social relationships of the two or more source users.

8. The method of claim 1, wherein the model is based on a $n \times 1$ user characteristics mean vector, the $n \times 1$ user characteristics mean vector representing values of characteristics for a typical source user.

9. The method of claim 1, wherein the social relationship information comprises a $m \times 1$ social relationship input vector, the $m \times 1$ social relationship input vector representing social relationships between the selected user and each of the one or more other users.

10. The method of claim 1, wherein the determining includes determining a $n \times 1$ predicted user characteristics vector that represents one or more predicted characteristics of the selected user.

11. The method of claim 1, further comprising inverting a $m \times m$ social relationship covariance matrix to derive the inverted $m \times m$ social relationship covariance matrix.

12. An apparatus for predicting one or more characteristics of a selected user, the apparatus comprising:
    a processor;
    memory to store instructions that, when executed by the processor cause the processor to:
        obtain a model based on a conditional multivariate normal distribution that relates social relationship information of one or more source users to characteristics of the one or more source users; obtain social relationship information relating the selected user and each of one or more other users; and determine one or more characteristics of the selected user based on the model and the social relationship information that relates the selected user and the one or more other users, wherein determining the one or more characteristics comprises:

multiplying an inverted m×m social relationship covariance matrix and a n×m user characteristics social relationship covariance matrix to derive a n×m combined covariance matrix, wherein the social relationship covariance matrix represents a deviation associated with pairs of typical values of the social relationship information of the one or more source users;

subtracting a m×1 social relationship mean vector from a m×1 social relationship input vector to derive a social relationship difference vector, wherein the social relationship mean vector represents the characteristics of the one or more source users;

multiplying the derived n×m combined covariance matrix and the social relationship difference vector to derive a user characteristic adjustment vector; and adding the user characteristic adjustment vector and a n×1 user characteristics mean vector to derive a n×1 user characteristics vector.

13. The apparatus of claim 12, wherein the social relationship information comprises one or more counts of hops between the selected user and each of the one or more other users.

14. The apparatus of claim 12, wherein the determination adjusts one or more characteristics of a typical user, as determined from the one or more source users, to determine the one or more characteristics of the selected user.

15. The apparatus of claim 12, wherein the model is based on a conditional multivariate normal distribution with mean vector m and covariance matrix s.

16. The apparatus of claim 12, wherein the model comprises a social relationships mean vector, the social relationships mean vector representing a number of hops from a typical source user to each of the one or more source users.

17. The apparatus of claim 12, wherein the model comprises a m×m social relationship covariance matrix, the m×m social relationship covariance matrix representing a covariance of social relationships of two or more of the one or more source users.

18. The apparatus of claim 12, wherein the model is based on a n×m user characteristics covariance social relationship matrix, the n×m user characteristics covariance social relationship matrix representing a covariance of one or more characteristics of two or more source users with social relationships of the two or more of the source users.

19. The apparatus of claim 12, wherein the model is based on a n×1 user characteristics mean vector, the n×1 user characteristics mean vector representing values of characteristics for a typical source user.

20. The apparatus of claim 12, wherein the social relationship information comprises a m×1 social relationship input vector, the m×1 social relationship input vector representing social relationships between the selected user and each of the one or more other users.

21. The apparatus of claim 12, wherein the determining includes determining a n×1 predicted user characteristics vector that represents one or more predicted characteristics of the selected user.

22. The apparatus of claim 12, wherein the determining the one or more characteristics of the selected user further comprises inverting a m×m social relationship covariance matrix to derive the inverted m×m social relationship covariance matrix.

23. An article of manufacture comprising a non-transitory machine-readable storage medium having machine executable instructions embedded thereon, which when executed by a machine, cause the machine to:

obtain a model based on a conditional multivariate normal distribution that relates social relationship information of one or more source users to characteristics of the one or more source users;

obtain social relationship information relating a selected user and each of one or more other users; and determine one or more characteristics of the selected user based on the model and the social relationship information that relates the selected user and the one or more other users, wherein determining the one or more characteristics comprises:

multiplying an inverted m×m social relationship covariance matrix and a n×m user characteristics social relationship covariance matrix to derive a n×m combined covariance matrix, wherein the social relationship covariance matrix represents a deviation associated with pairs of typical values of the social relationship information of the one or more source users;

subtracting a m×1 social relationship mean vector from a m×1 social relationship input vector to derive a social relationship difference vector, wherein the social relationship mean vector represents the characteristics of the one or more source users;

multiplying the derived n×m combined covariance matrix and the social relationship difference vector to derive a user characteristic adjustment vector; and adding the user characteristic adjustment vector and a n×1 user characteristics mean vector to derive a n×1 user characteristics vector.

* * * * *